US012669582B2

(12) United States Patent
Baeg

(10) Patent No.: US 12,669,582 B2
(45) Date of Patent: Jun. 30, 2026

(54) METHOD AND SYSTEM FOR DETECTING OBJECT

(71) Applicants:HYUNDAI MOTOR COMPANY, Seoul (KR); KIA CORPORATION, Seoul (KR)

(72) Inventor: Ju Heon Baeg, Seoul (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 413 days.

(21) Appl. No.: 18/238,169

(22) Filed: Aug. 25, 2023

(65) Prior Publication Data

US 2024/0151818 A1     May 9, 2024

(30) Foreign Application Priority Data

Nov. 8, 2022    (KR) ........................ 10-2022-0147527

(51) Int. Cl.
*G01S 7/48*          (2006.01)
*G01S 17/89*        (2020.01)
*G06T 7/73*         (2017.01)

(52) U.S. Cl.
CPC ............ *G01S 7/4802* (2013.01); *G01S 17/89* (2013.01); *G06T 7/73* (2017.01); *G06T 2207/10028* (2013.01); *G06T 2207/30252* (2013.01)

(58) Field of Classification Search
None
See application file for complete search history.

(56) References Cited

U.S. PATENT DOCUMENTS

| 8,818,609 | B1 * | 8/2014 | Boyko | B60W 40/04 |
| | | | | 701/28 |
| 10,247,854 | B2 | 4/2019 | Zhu et al. | |
| 2020/0191914 | A1 | 6/2020 | Kunz et al. | |
| 2020/0232799 | A1 * | 7/2020 | Parchami | G01C 21/20 |
| 2022/0189040 | A1 | 6/2022 | Baeg et al. | |

FOREIGN PATENT DOCUMENTS

| KR | 10-1092643 | B1 | 12/2011 |
| KR | 10-2019-0049871 | A | 5/2019 |
| KR | 10-2151002 | B1 | 9/2020 |
| KR | 10-2023-0025213 | A | 2/2023 |

OTHER PUBLICATIONS

Piroli, Dallabetta, Walessa, Meissner, Kopp, and Dietmayer, "Detection of Condensed Vehicle Gas Exhaust in LiDAR Point Clouds", arXiv:2207.04908v1, Jul. 11, 2022 (Year: 2022).*

* cited by examiner

*Primary Examiner* — Shelby A Turner
*Assistant Examiner* — Cynthia L Davis
(74) *Attorney, Agent, or Firm* — Morgan Lewis & Bockius LLP

(57)          ABSTRACT

According to an embodiment of the present disclosure, a method of detecting an object around a vehicle includes clustering points obtained from a Light Detection and Ranging (LiDAR) sensor of the vehicle, determining a position of a threshold line corresponding to a rear of a first object based on object points of a cluster box generated according to the clustering, and generating a first bounding box of the first object and a second bounding box of a second object based on a distribution of the object points based on the position of the threshold line.

20 Claims, 11 Drawing Sheets

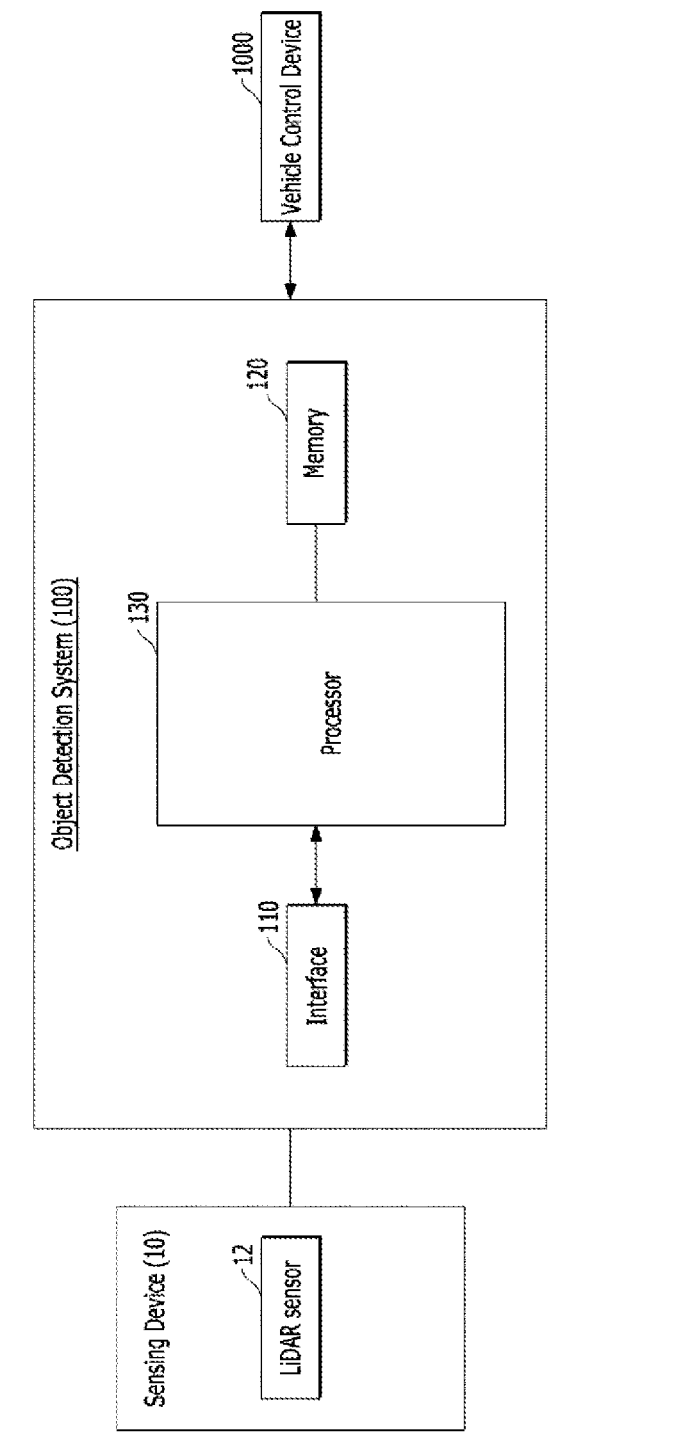
FIG. 1

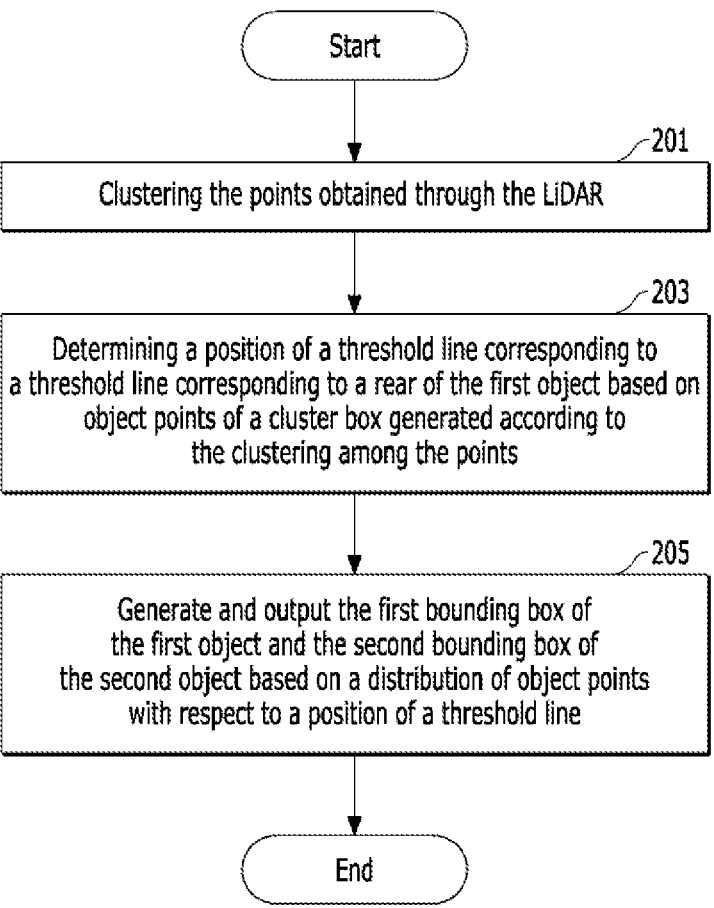

Start

201
Clustering the points obtained through the LiDAR

203
Determining a position of a threshold line corresponding to
a threshold line corresponding to a rear of the first object based on
object points of a cluster box generated according to
the clustering among the points 205
Generate and output the first bounding box of
the first object and the second bounding box of
the second object based on a distribution of object points
with respect to a position of a threshold line End

FIG. 2

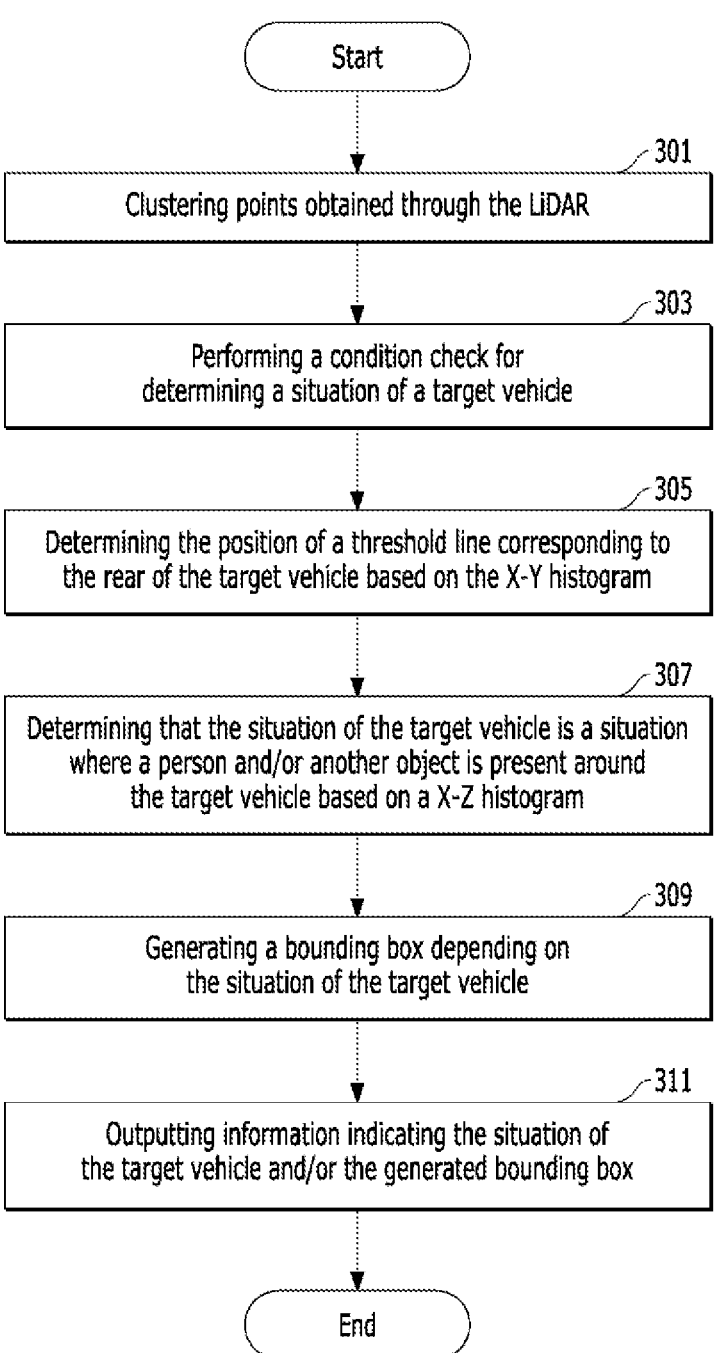

Start

301
Clustering points obtained through the LiDAR

303
Performing a condition check for
determining a situation of a target vehicle 305
Determining the position of a threshold line corresponding to
the rear of the target vehicle based on the X-Y histogram 307
Determining that the situation of the target vehicle is a situation
where a person and/or another object is present around
the target vehicle based on a X-Z histogram 309
Generating a bounding box depending on
the situation of the target vehicle 311
Outputting information indicating the situation of
the target vehicle and/or the generated bounding box End

FIG. 3

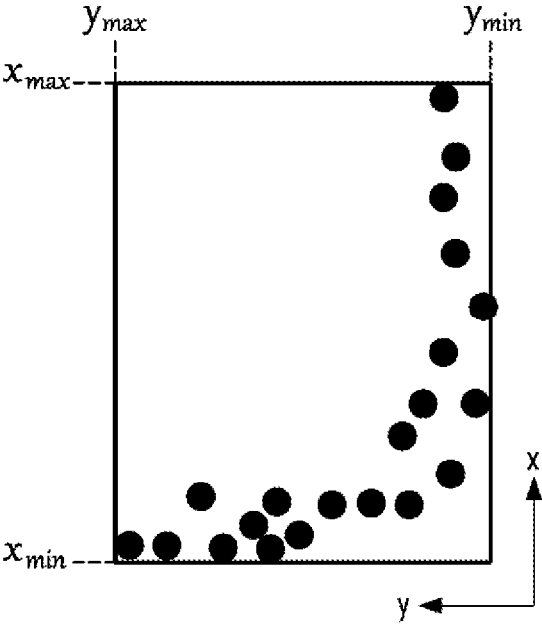
FIG. 4

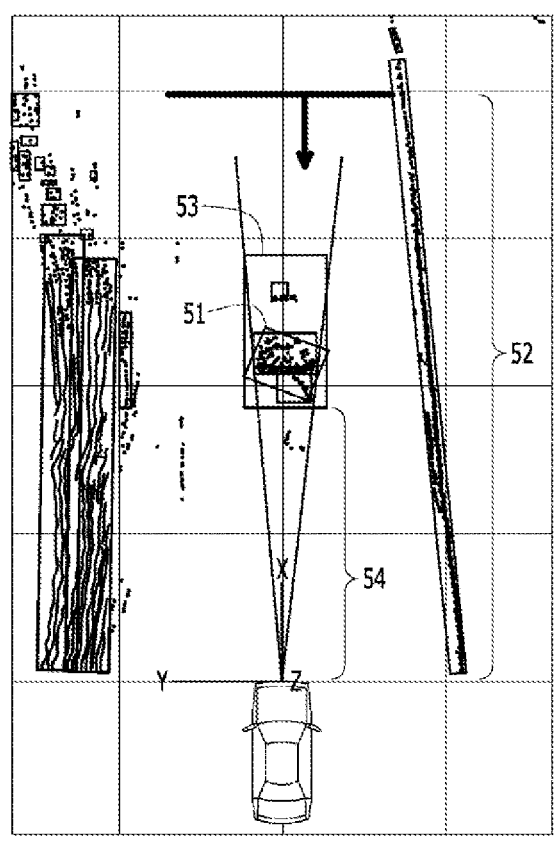
FIG. 5A                    FIG. 5B

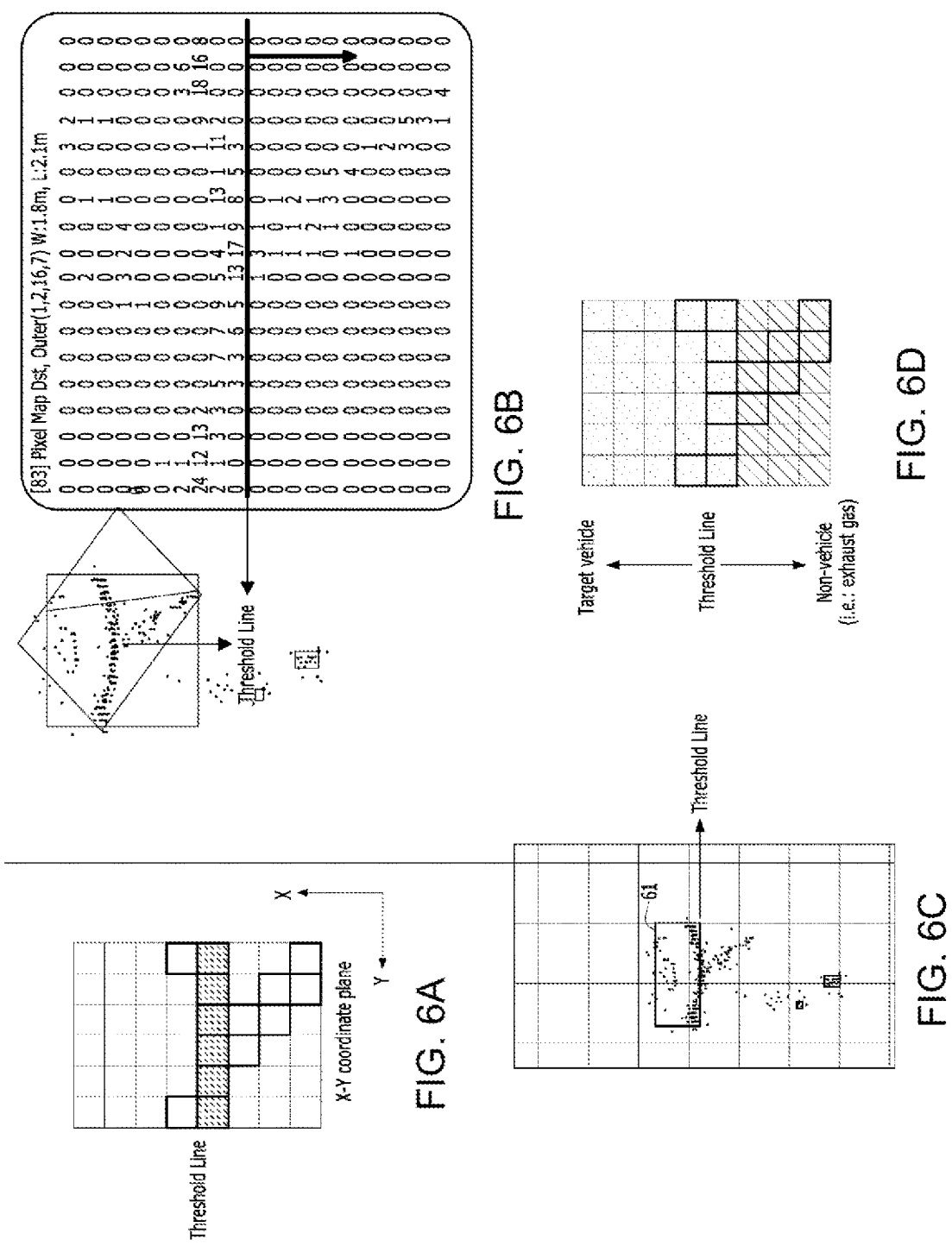
FIG. 6A
Threshold Line
X-Y coordinate plane
X
Y
FIG. 6B Pixel Map Dst, Outer(1,2,16,7) W:1.8m, L:2.1m
Threshold Line
FIG. 6C
Threshold Line
61
FIG. 6D
Target vehicle
Threshold Line
Non-vehicle
(i.e.: exhaust gas)

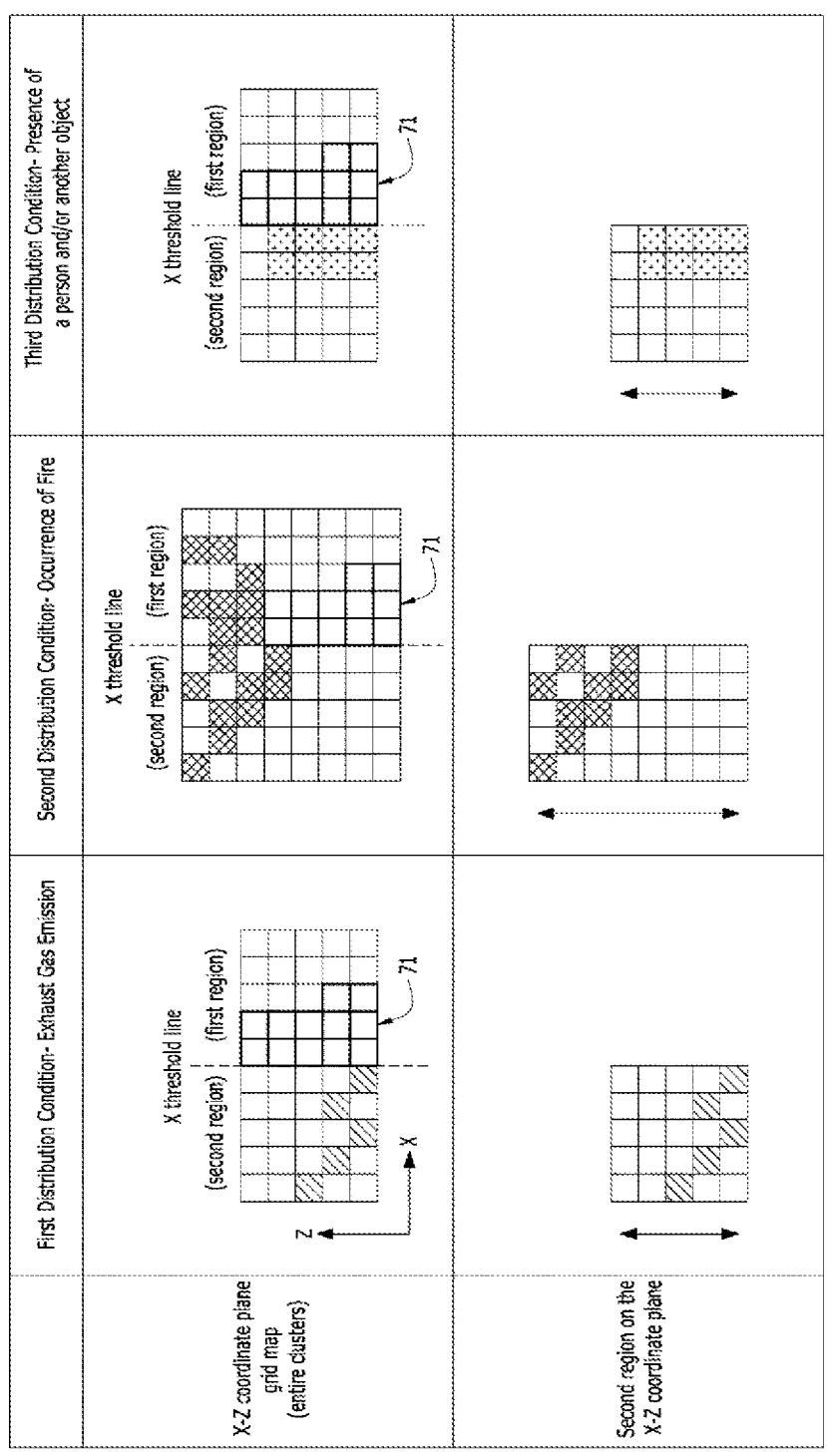
FIG. 7

FIG. 8

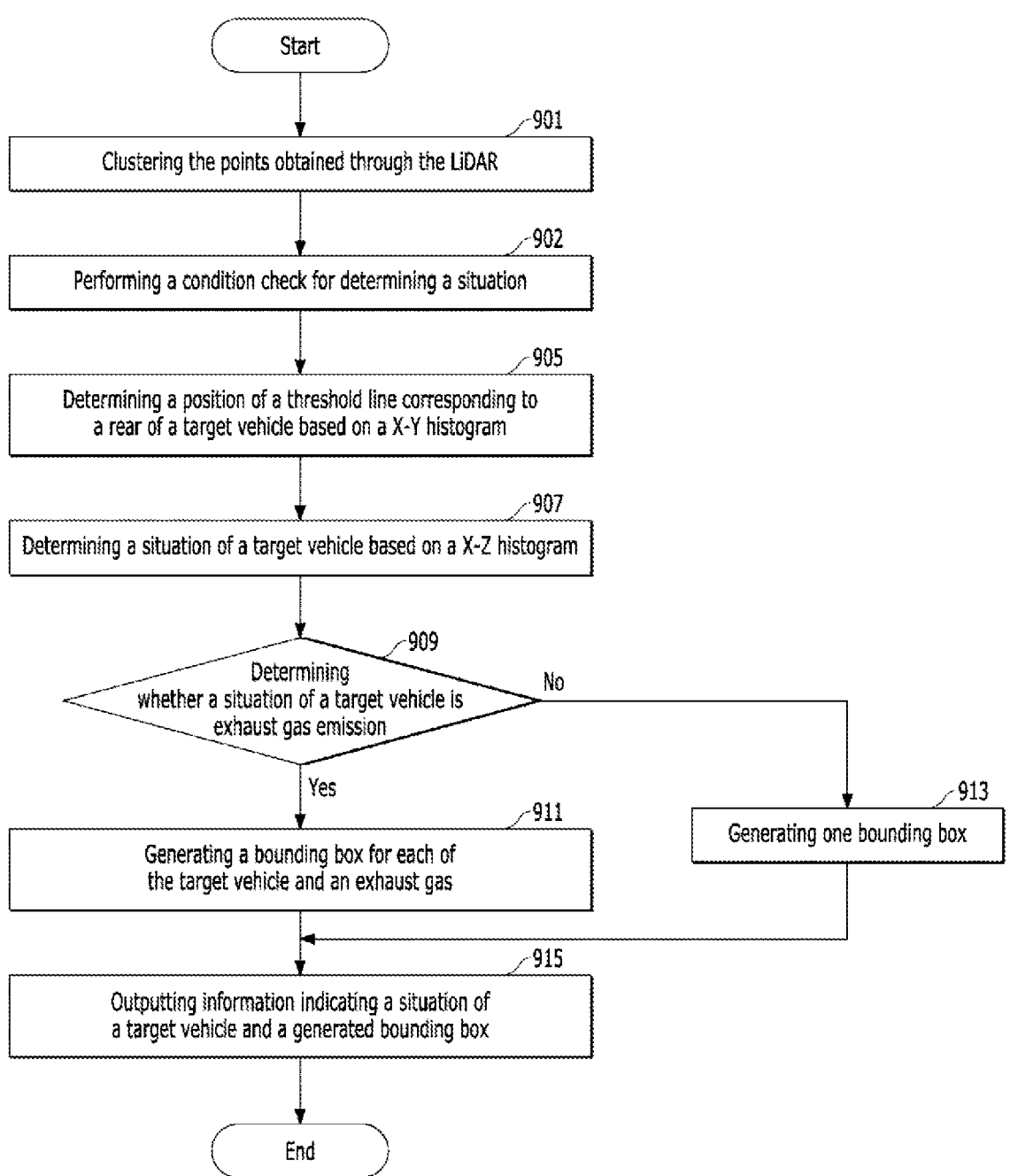
FIG. 9

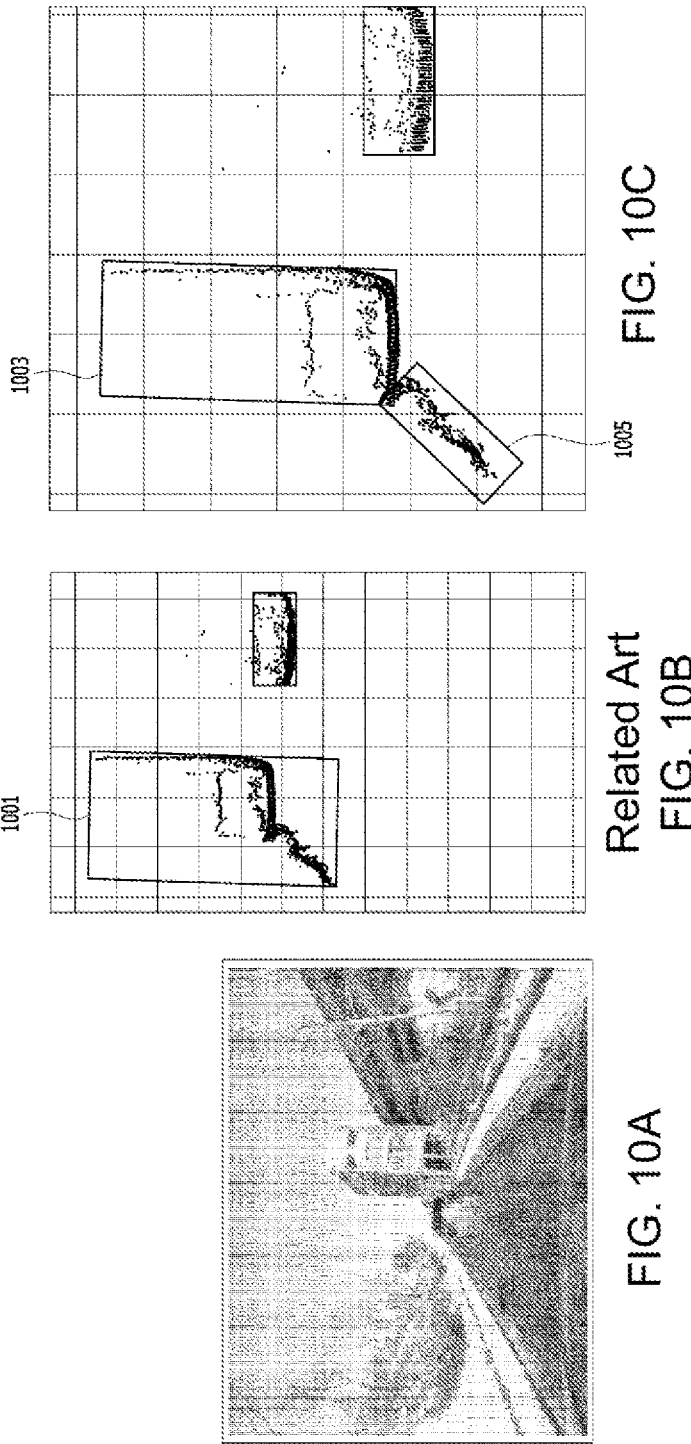
1003
1005
FIG. 10C
1001
Related Art
FIG. 10B
FIG. 10A

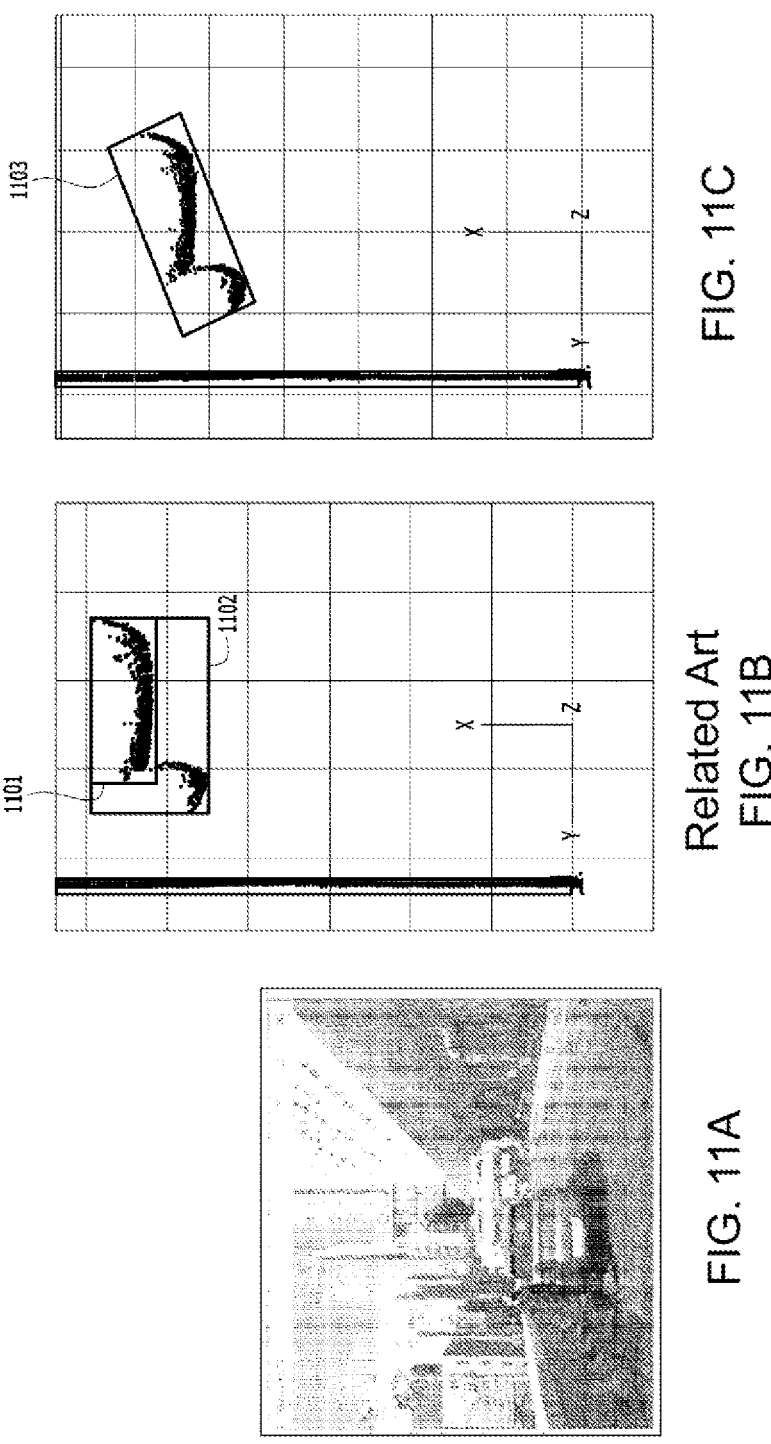
FIG. 11C
Related Art
FIG. 11B
FIG. 11A

METHOD AND SYSTEM FOR DETECTING OBJECT

CROSS-REFERENCE TO RELATED APPLICATION

The present application claims the benefit of priority to Korean Patent Application No. 10-2022-0147527, filed on Nov. 8, 2022 in the Korean Intellectual Property Office, the entire contents of which is incorporated herein by reference.

TECHNICAL FIELD

The present disclosure relates to a method and system for detecting an object.

BACKGROUND

A Light Detection and Ranging (LiDAR) sensor has the feature of generating points for gases with high reflectivity such as exhaust gas. Accordingly, when the conventional object recognition system recognizes the object based on the points acquired from the LiDAR sensor, there have been error in that the target vehicle and the exhaust gas emitted from the target vehicle are recognized as one object.

The exhaust gas may vary irregularly depending on the weather environment and/or the state of the vehicle. For example, aspects of the exhaust gas discharged by the target vehicle may be irregular depending on a wind direction, a wind speed, whether the target vehicle emitting exhaust gas is stopped or driven, a type of an exhaust port of the target vehicle and/or a position of the target vehicle, etc. According to the irregularity of exhaust gas, there is a limitation in the conventional object recognition system for recognizing exhaust gas by using a LiDAR sensor.

The conventional object recognition system has an issue of inability to determine points corresponding to the exhaust gas based on echo (or intensity) information, which is the LiDAR sensor information, due to deterioration of sensor performance of the LiDAR sensor. In particular, LiDAR sensor incurred large deviation in the reflectivity information depending on various conditions such as color of the target vehicle, distance of the target vehicle and/or weather conditions, etc.

In addition, the conventional object detection technology has not developed a technology that separately treats exhaust gas emission by a target vehicle. Accordingly, there have been errors of determination where the exhaust gas is clustered into one cluster with the target vehicle.

In addition, there have been errors that the form of the box indicating the exhaust gas and the target vehicle (longitudinal position, transverse position, and/or heading angle) is also irregularly changed due to the irregular changes in the form of the exhaust gas. Based on the data with errors as described above, when the vehicle controls autonomous driving, a collision risk situation of the vehicle may be erroneously determined and problems such as sudden braking and/or control authority transfer may occur.

The information disclosed in the Background section above is to aid in the understanding of the background of the present disclosure, and should not be taken as acknowledgement that this information forms any part of prior art.

BRIEF SUMMARY

Various aspects of the present disclosure are directed to providing a method and a system for detecting an object capable of attenuating the issue of the limitation in the conventional object detection technology.

For example, the method and system for detecting an object according to an exemplary embodiment of the present disclosure may distinguish a target vehicle from its exhaust gas.

Accordingly, a method and system for detecting an object according to an exemplary embodiment of the present disclosure may improve a conventional object detecting technological issue (i.e., an issue of falsely detecting the form of object by determining a target vehicle and exhaust as one cluster) and an issue of erroneously determining a collision between object and vehicle according to the error of object detection (i.e., a situation in which a collision error between the object and the vehicle is erroneously determined according to the shape of the erroneously detected object).

An exemplary embodiment of the present disclosure may provide a method and system for detecting an object capable of supplementing the sensor limit of a LiDAR sensor.

For example, the method and system for detecting an object according to an exemplary embodiment of the present disclosure may provide a new technology using point (x, y, z) information of the LiDAR sensor when the reflectivity of the LiDAR sensor is not utilized due to deterioration of sensor performance of the LiDAR sensor in a situation where exhaust gas is discharged from the target vehicle.

An exemplary embodiment of the present disclosure may provide a method and system for detecting an object capable of determining a special situation.

For example, the method and system for detecting an object according to an exemplary embodiment of the present disclosure may provide technology capable of distinguishing an exhaust situation of a target vehicle, a fire situation, and a situation where a person and/or an object is located adjacent to the vehicle based on points of the LiDAR sensor.

An exemplary embodiment of the present disclosure may provide a method and a system for detecting an object capable of determining important scenarios of autonomous driving.

Prior to this instance, there has been a case in which the exhaust gas generated by the target vehicle becomes a great risk factor for autonomous driving control of the vehicle. Also, there have been prior issues where exhaust gas generated from various factors abruptly change its shape, and thus all shapes (also referred to as cases) of gas are impossible to be dealt with.

According to these aspects, the method and system for detecting an object according to an exemplary embodiment of the present disclosure may provide technology for separately recognizing the target vehicle and the exhaust gas, thereby increasing safety of the autonomous driving system of the vehicle and improving mass-production service quality.

According to an exemplary embodiment of the present disclosure, an object detection method may include clustering points obtained from a LiDAR sensor of the vehicle, determining a position of a threshold line corresponding to a rear of a first object based on object points of a cluster box generated according to the clustering, and generating a first bounding box of the first object and a second bounding box of a second object based on a distribution of the object points based on the position of the threshold line.

In at least one embodiment of the present disclosure, the method further includes determining whether a reference condition including at least one of a first condition that the cluster box is positioned within a predetermined region of interest, a second condition that a size of the cluster box is included in a predetermined reference size range, or a third condition that a third object is not detected between the first object and the vehicle is satisfied, wherein the determining of the position of the threshold line is performed when the reference condition is satisfied.

In at least one embodiment of the present disclosure, the method further includes comprising determining that the third object is not detected when no preceding cluster box is generated between the first object and the vehicle by the clustering, wherein the preceding cluster box includes a cluster box having a size greater than or equal to a predetermined threshold size.

In at least one embodiment of the present disclosure, the method further includes including generating a third bounding box of the first object based on the object points when the reference condition is not satisfied.

In at least one embodiment of the present disclosure, the determining of the position of the threshold line corresponding to the rear surface of the first object includes generating a first grid map of an XY coordinate plane on which the object points are projected and determining a row whose density of the object points is greatest among rows of the first grid map as a row in which a first threshold line is located.

In at least one embodiment of the present disclosure, the first grid map includes first grid cells, and each grid cell of the first grid map is assigned with a numerical value indicating the number of object points included in the corresponding grid cell of the first grid map among the object points.

In at least one embodiment of the present disclosure, the determining of the row whose density of the object points is greatest among the rows of the first grid map as the row in which the first threshold line is located includes determining a sum of numerical values assigned to all grid cells of each of the rows of the first grid map, determining a ratio of the number of grid cells whose numerical values are greater than or equal to a predetermined threshold value to a total number of all grid cells for each row of the first grid map, and determining a row whose sum of the numerical values assigned to all grid cells thereof is greatest among the rows of the first grid map and the ratio of which is greater than or equal to a predetermined threshold ratio as the row whose density of the object points is greatest.

In at least one embodiment of the present disclosure, the determining of the position of the threshold line corresponding to the rear surface of the first object determining includes generating a second grid map of an XZ coordinate plane on which the object points are projected, determining a position of a second threshold line in the second grid map by associating information of an X coordinate of the row in which the first threshold line is located in the first grid map, and determining a distribution of the object points based on the position of the second threshold line in the second grid map, and wherein the determining of the distribution of the object points includes determining a distribution of grid cells in which at least one object point among the object points is included based on the position of the second threshold line in the second grid map.

In at least one embodiment of the present disclosure, the second grid map includes second grid cells, and each grid cell of the second grid map is assigned with a numerical value indicating the number of object points included in the corresponding grid cell of the second grid map among the object points.

In at least one embodiment of the present disclosure, the first bounding box is generated based on first object points in a first region of two regions divided by the second threshold line on the second grid map, and wherein the second bounding box is generated based on second object points in a second region of the two regions.

In at least one embodiment of the present disclosure, the method further includes including outputting a third bounding box generated based on the object points when the first bounding box and the second bounding box are output, wherein the third bounding box has a shape of a combination of the first bounding box and the second bounding box.

In at least one embodiment of the present disclosure, the generating of the first bounding box and the second bounding box is performed in a case where the first object points are uniformly distributed in the first region, first grid cells of the first map forms a first cluster whose size is greater than or equal to a predetermined threshold size, second grid cells of the second map in each of which at least one second object point is included are irregularly distributed in the second region, and a maximum Z-axis value of a second cluster of the second grid cells is smaller than a maximum Z-axis value of the first cluster.

In at least one embodiment of the present disclosure, determining that there is an event of fire corresponding to the second object around the first object in a case where the first object points are uniformly distributed in the first region, the first grid cells forms the first cluster whose size is greater than or equal to the predetermined threshold size, the second grid cells in each of which at least one second object point is included are irregularly distributed in the second region, and the maximum Z-axis value of the second cluster of the second grid cells is greater than the maximum Z-axis value of the first cluster, and outputting information indicating the event of fire.

In at least one embodiment of the present disclosure, the method further includes determining that there is a person or another object corresponding to the second object around the first object in a case where the first object points are uniformly distributed in the first region, the first grid cells forms the first cluster whose size is greater than or equal to the predetermined threshold size, the second grid cells are uniformly distributed, the second cluster of the second grid cells has a size greater than or equal to a predetermined threshold size, and outputting information indicating that there is the person or the other object.

A system of detecting an object around a vehicle, according to an embodiment of the present disclosure, comprises an interface for receiving points from a LiDAR sensor of the vehicle, and a processor electrically or communicatively connected to the interface, wherein the processor is configured to cluster points obtained from the LiDAR sensor of the vehicle, determine a position of a threshold line corresponding to a rear of a first object based on object points of a cluster box generated according to the clustering, and generate a first bounding box of the first object and a second bounding box of a second object based on a distribution of the object points based on the position of the threshold line.

In at least one embodiment of the system, the processor is further configured to determine whether a reference condition including at least one of a first condition that the cluster box is positioned within a predetermined region of interest, a second condition that a size of the cluster box is included in a predetermined reference size range, or a third condition that a third object is not detected between the first object and the vehicle is satisfied to determine the position of the threshold line.

In at least one embodiment of the system, the processor is further configured to generate a first grid map of an XY coordinate plane on which the object points are projected and determine a row whose density of the object points is greatest among rows of the first grid map as a row in which a first threshold line is located.

In at least one embodiment of the system, the first grid map includes first grid cells, and each grid cell of the first grid map is assigned with a numerical value indicating the number of object points included in the corresponding grid cell of the first grid map among the object points.

In at least one embodiment of the system, the processor is further configured to determine a sum of numerical values assigned to all grid cells of each of the rows of the first grid map, determine a ratio of the number of grid cells whose numerical values are greater than or equal to a predetermined threshold value to a total number of all grid cells for each row of the first grid map, and determine a row whose sum of the numerical values assigned to all grid cells thereof is greatest among the rows of the first grid map and the ratio of which is greater than or equal to a predetermined threshold ratio as the row whose density of the object points is greatest.

In at least one embodiment of the system, the processor is further configured to generate a second grid map of an XZ coordinate plane on which the object points are projected and determine a position of a second threshold line in the second grid map by associating information of an X coordinate of the row in which the first threshold line is located in the first grid map, and determine a distribution of grid cells in which at least one object point among the object points is matched based on the position of the second threshold line in the second grid map.

The method for detecting an object and system according to an embodiment of the present disclosure may improve error issues (i.e., an object clustering error, an object shape detection error, and/or an error in determining a collision possibility between the vehicle and the object) according to the conventional object detection technology by determining the vehicle and the exhaust gas into different objects in an exhaust gas emission situation of a target vehicle.

The present disclosure relates to a method and system for detecting an object according to an embodiment of the present disclosure may differentiate situations, and more particularly, a situation of exhaust gas emission of a target vehicle, a fire situation of fire occurring around the vehicle, a situation where a person and/or another object are located around the target vehicle, and the like may be distinguished according to distributive features of points acquired from a LiDAR sensor.

A method and a system for detecting an object according to an embodiment of the present disclosure may supplement a technology for detecting an object so that object detection is possible by using only points obtained from a LiDAR sensor in a situation where reflectivity is not utilized due to the deterioration of sensor performance of the LiDAR sensor in an exhaust mantissa emission situation of a target vehicle.

The method for detecting an object and system according to an embodiment of the present disclosure may increase the safety of a self-driving system of a vehicle and improve the quality of mass-production service by recognizing exhaust gas when a target vehicle driving adjacent to the vehicle discharges the exhaust gas.

The method and system of the present disclosure have other features and advantages which will be apparent from or are set forth in more detail in the accompanying drawings, which are incorporated herein, and the following Detailed Description, which together serve to explain certain principles of the present disclosure.

BRIEF DESCRIPTION OF THE DRAWINGS

FIG. 1 is a block drawing of a vehicle according to an exemplary embodiment of the present disclosure.

FIG. 2 is a flowchart of an operation of an object detection system according to an exemplary embodiment of the present disclosure.

FIG. 3 is a flowchart of an operation of an object detection system according to an exemplary embodiment of the present disclosure.

FIGS. 4, 5A, 5B, 6A, 6B, 6C, 6D, and 7 are drawings for describing an operation of the object detection system according to an exemplary embodiment of the present disclosure.

FIG. 8 is a drawing illustrating an output result of the object detection system according to an exemplary embodiment of the present disclosure.

FIG. 9 is a flowchart of an operation of an object detection system according to an exemplary embodiment of the present disclosure.

FIGS. 10A, 10B and 10C and FIGS. 11A, 11B, and 11C are drawings illustrating a bounding box generated and output according to a conventional technology and an exemplary embodiment of the present disclosure.

It may be understood that the appended drawings are not necessarily to scale, presenting a somewhat simplified representation of various features illustrative of the basic principles of the present disclosure. The specific design features of the present disclosure as included herein, including, for example, specific dimensions, orientations, locations, and shapes will be determined in part by the particularly intended application and use environment.

In the figures, reference numbers refer to the same or equivalent parts of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

Like reference numerals refer to like elements throughout the specification. The present specification does not describe all elements of the embodiments, and general contents in the technical field to which the present disclosure pertains or overlapping contents between the embodiments are omitted. The term "unit, module, or device" used in the specification may be implemented by software or hardware, and according to embodiments, a plurality of "units, modules, or devices" may be implemented as one element or one "unit, module, or device" may include a plurality of components.

Throughout the specification, when a part is "connected" to another part, it includes the case of being directly connected and the case of being indirectly connected, and the indirect connection includes being connected through a wireless communication network.

In addition, when a part "includes" a component, this means that other components may be further included, rather than excluding other elements, unless specifically stated otherwise.

Terms such as "first", "second", etc., are used to distinguish one element from another, and elements are not limited by the above terms.

A singular expression includes a plural expression unless there is a clear exception in the context.

In each step, an identification symbol is used for convenience of description, and thus the identification symbol does not describe an order of each step, and each step may be performed in a different order from a specified order unless a specific order is clearly described in the context.

An exemplary embodiment of the present disclosure may provide a technology for differentiating a target vehicle and an exhaust gas through a predetermined condition and histogram analysis in a limited situation of data acquisition of a LiDAR sensor of a vehicle and/or a limited situation of object detection of an object detection system of the vehicle due to exhaust gas of a target vehicle driving around the vehicle. For example, according to an exemplary embodiment of the present disclosure, a bounding box for each of the vehicle and the exhaust gas may be generated and output, and information on the corresponding situation may also be output.

Further, according to an exemplary embodiment of the present disclosure, a situation of fire occurrence around the target vehicle and/or a situation where a person and/or another object is located around the target vehicle may be recognized, and information on the corresponding situation may be output.

Hereinafter, operation principles and various exemplary embodiments of the present disclosure will be described with reference to the accompanying drawings.

FIG. 1 is a block drawing of a vehicle according to an exemplary embodiment of the present disclosure.

Referring to FIG. 1, the vehicle 1 may include a sensing device 10, an object detection system 100, and/or a vehicle control device 1000.

The sensing device 10 may include one or more devices capable of acquiring information about an object (also referred to as a target) located around the vehicle 1.

The sensing device 10 may include a LiDAR sensor 12.

The LiDAR sensor 12 may comprise one or more LiDAR sensor, and may be mounted in the vehicle 1 to generate LiDAR sensor data, that is, a plurality of point cloud data (also referred to as point cloud data) by emitting a laser pulse toward the periphery of the vehicle 1.

Meanwhile, although not shown, the sensing device 10 may further include a radar (not shown) capable of sensing objects around the vehicle 1 and/or a camera (not shown) capable of obtaining image data around the vehicle 1.

The object detection system 100 may include an interface 110, a memory 120, and/or a processor 130.

The interface 110 may transmit a command or data input from another device (i.e., the sensing device 10 and/or the vehicle control device 1000) of the vehicle 1 or a user to another feature element of the object detection system 100 or may output a command or data received from another element of the object detection system 100 to another device of the vehicle 1.

The interface 110 may include a communication module (not shown) to communicate with other devices of the vehicle 1.

The communication module of the interface 110 may be a hardware device implemented by various electronic circuits, e.g., processor, transceiver, etc., to transmit and receive signals via wireless or wired connections.

For example, the communication module may include a communication module capable of performing communication between devices of the vehicle 1, for example, controller area network (CAN) communication and/or local interconnect network (LIN) communication, through a vehicle communication network. Further, the communication module may include a wired communication module (i.e., a power line communication module) and/or a wireless communication module (i.e., a cellular communication module, a Wi-Fi communication module, a short-range wireless communication module, and/or a global navigation satellite system (GNSS) communication module).

The memory 120 may store various data used by at least one feature element of the object detection system 100, i.e., input data and/or output data for a software program and commands associated with the software program.

The memory 120 may include a nonvolatile memory such as a cache, a Read Only Memory (ROM), a Programmable ROM (PROM), an Erasable Programmable ROM (EPROM), an Electrically Erasable Programmable ROM (EEPROM), and/or a flash memory, and/or a volatile memory such as a Random Access Memory (RAM).

A processor 130 (also referred to as a control circuit or controller) (e.g., computer, microprocessor, CPU, ASIC, circuitry, logic circuits, etc.) of the object detection system 100 may control at least one different element (i.e., hardware elements (i.e., an interface 110 and/or memory 120) and/or a software element (i.e., a software program) from the object detection system 100, and it may perform various data processing and operations.

In various exemplary embodiments of the present disclosure, the memory 120 and the processor 130 may be implemented as separate semiconductor circuits. Alternatively, the memory 120 and the processor 130 may be implemented as a single integrated semiconductor circuit. The processor 130 may embody one or more processor(s).

The processor 130 may group points obtained from the LiDAR sensor 12 through the interface 110. The processor 130 may determine the position of the threshold line corresponding to the object, i.e., the rear surface of the target vehicle, based on object points of the cluster box generated according to the clustering among the points obtained from the LiDAR sensor 12. The processor 130 may determine a distribution of object points based on the position of the threshold line.

The processor 130 may determine the object points of the cluster box as object points of one object based on the distribution of the object points that is on the position of the threshold line, and may generate and output a bounding box for one object.

The processor 130 may determine the object points of the cluster box are object points of two objects based on the distribution of the object points that is on the position of the threshold line, and may generate and output a bounding box for each of the two objects.

For example, the processor 130 may determine the target vehicle is in a situation where the exhaust gas is discharged based on the distribution of the object points, and may generate and output a bounding box (also referred to as a first bounding box) corresponding to the target vehicle and a bounding box (also referred to as a second bounding box) corresponding to the exhaust gas.

When the first bounding box and the second bounding box are output, the processor 130 may output a third bounding box indicating a form corresponding to a form in which the first bounding box and the second bounding box are combined, i.e., the target vehicle and the exhaust gas as one object.

When the first bounding box and the second bounding box are output, the processor 130 may output information indicating a situation where the target vehicle emits the exhaust gas.

For example, the processor 130 determines that an event of fire has occurred in the target vehicle and/or around the target vehicle based on the distribution of object points, and may generate and output one bounding box regarding the target vehicle and the fire.

When one bounding box is output, the processor 130 may output information indicating that an event of fire has occurred in the target vehicle and/or around the target vehicle.

For example, the processor 130 may determine a presence of a person and/or another object around the target vehicle based on the distribution of the object points, and may generate and output one bounding box for the target vehicle and the person and/or another object.

When one bounding box is output, the processor 130 may output information indicating a presence of a person and/or another object around the target vehicle.

The vehicle control device 1000 may perform driving control of the vehicle 1 (i.e., avoidance control, driving which is the same as the existing control, etc.) based on the output result of the object detection system 100.

FIG. 2 is a flowchart of an operation of the object detection system 100 (and/or the processor 130 of the object detection system 100) according to one exemplary embodiment of the present disclosure.

Referring to FIG. 2, the object detection system 100 may group the points obtained through the LiDAR sensor 12 of the vehicle 1 (201), in other words perform a clustering process.

In operation 203, the object detection system 100 may determine a position of a threshold line corresponding to a rear of the first object based on object points of a cluster box generated according to the clustering among the points obtained through the LiDAR sensor 12.

The object detection system 100 may determine whether the reference condition is satisfied and perform operation 203 when the reference condition is satisfied.

For example, the reference condition may include a first condition that the cluster box is positioned within a predetermined area of interest, a second condition that the size of the cluster box is included in a predetermined reference size range, and/or a third condition that an object (also referred to as a third object) positioned between the first object and the vehicle 1 is not detected.

The object detection system 100 may generate a first grid map (also referred to as an XY plane grid map) of an XY-coordinate plane to which object points of a cluster box are matched or projected.

For example, the object detection system 100 may match and/or place object points of a cluster box in a first grid map.

For example, the object detection system 100 may assign a numerical value indicating the number of matched object points among the object points to each grid cell of the first grid map.

In the first grid map, the object detection system 100 may determine a row where the density of the matched object points is greatest among the rows of the first grid map as the row where the threshold line is located.

In operation 205, the object detection system 100 may generate and output the first bounding box of the first object and a second bounding box of the second object based on a distribution of object points that is on a position of a threshold line corresponding to a rear of the first object.

The object detection system 100 may generate the second grid map (also referred to as an XZ plane grid map) of the XZ coordinate plane to which the object points of the cluster box are matched. In this case, the object detection system 100 may determine a position of the threshold line in the second grid map by associating X coordinate information of the row in which the threshold line is located in the first grid map.

The object detection system 100 may determine the distribution of object points by using the position of the threshold line in the second grid map as a reference.

For example, the object detection system 100 may determine a distribution of grid cells which at least one of the object points is matched to or included in, based on a position of a threshold line in the second grid map.

For example, the above-described operation 205 may be performed when the distribution of the object points satisfies the first distribution condition predetermined to correspond to the exhaust gas emission of the first object (also referred to as a first target vehicle). A detailed embodiment of the predetermined first distribution condition will be described later with reference to FIG. 7.

Meanwhile in the above-described embodiment of FIG. 2, when the above-described reference condition (the reference condition including the first condition, the second condition, and/or the third condition) is not satisfied, the object detection system 100 may recognize that the cluster box represents one first object, and generate and output a bounding box (also referred to as the third bounding box) of the first object based on object points of the cluster box.

In addition to the above-described embodiment of FIG. 2, the object detection system 100, when outputting the first bounding box and the second bounding box in operation 205, may perform together an output of a third bounding box having a shape corresponding to a shape in which the first bounding box and the second bounding box are combined and/or an output of information indicating a situation where the first object emits the exhaust gas.

In addition to the above-described embodiment of FIG. 2, the object detection system 100 may determine that the distribution of the object points satisfies the second distribution condition predetermined to correspond to a situation where an event of fire has occurred in the first object (or the peripheries of the first object). In this determination, the object detection system 100 may output a bounding box indicating the first object and the fire as one object and/or output information indicating that the fire has occurred in the first object. A detailed embodiment of the predetermined second distribution condition will be described later with reference to FIG. 7.

In addition, in the above-described embodiment of FIG. 2, the object detection system 100 may determine that the distribution of the object points satisfies the third distribution condition predetermined to corresponding to a situation where a person and/or another object is present around the first object. In this determination, the object detection system 100 may output a bounding box indicating the first object and a person and/or another object in the periphery of the first object as one object and/or output information indicating a situation where the person and/or another object is in the periphery of the first object. A detailed embodiment of the predetermined third distribution condition will be described later with reference to FIG. 7.

FIG. 3 is a flowchart of an operation of the object detection system 100 (and/or the processor 130 of the object detection system 100) according to an exemplary embodiment of the present disclosure. FIGS. 4, 5, 6 and 7 are drawings for describing an operation of the object detection system 100 (and/or the processor 130 of the object detection system 100) according to an exemplary embodiment of the present disclosure. FIG. 8 is a drawing illustrating an output result of the object detection system 100 (and/or the processor 130 of the object detection system 100) according to an exemplary embodiment of the present disclosure.

Referring to FIG. 3, when a target vehicle that is mainly driven in the periphery of the vehicle 1 emits exhaust gas and the LiDAR sensor and/or object detection is in a tight situation due to the exhaust gas, the object detection system 100 may generate a separate bounding box for distinguishing the target vehicle and the exhaust gas from each other and outputs information regarding the situation, thereby allowing the vehicle 1 to perform driving control and recognize the situation of the exhaust gas occurred.

In addition, when determining the occurrence of fire in the target vehicle, the object detection system 100 may generate one bounding box and output information on the corresponding situation, thereby allowing the vehicle 1 to perform driving control to avoid the target vehicle.

In addition, when determining a situation where the person and/or another object is present around the target vehicle, the object detection system 100 may generate one bounding box and output information on the corresponding situation, thereby allowing the vehicle 1 to perform driving control to avoid the target vehicle and the person and/or another object.

The object detection system 100 may perform clustering of points obtained through the LiDAR sensor 12 of the vehicle 1 (301).

The clustering of points may include generating of an object cluster and/or generating of a cluster box representing a target object.

The object cluster is a set of points (also referred to as object points) for one object, and the object detection system 100 may generate the object cluster by determining points adjacent to each other as points of the same object. For example, one of the techniques developed in the related art may be applied to a scheme of determining points adjacent to each other as points of the same object.

The object detection system 100 may generate a cluster box based on coordinate values of points.

For example, the object detection system 100 may generate a cluster box based on a maximum value and a minimum value of each coordinate of a coordinate system among point data included in an object cluster.

For example, when the coordinate system is an xyz coordinate system, the object detection system 100 may identify a maximum value and a minimum value of each coordinate of the xyz coordinate system, i.e., a maximum value and a minimum value of an x coordinate (x_max and x min), a maximum value and a minimum value of a y coordinate (y max and y_min), and a maximum value and a minimum value of a z coordinate (z max and z min). Further, the object detection system 100 generates a box in a surrounding form of points included in the cluster based on a maximum value and a minimum value of each coordinate of the xyz coordinate system.

As another example, when the coordinate system is an xy coordinate system as illustrated in FIG. 4, that is, when points are projected on an xy coordinate plane, the object detection system 100 may determine each corner based on the maximum and minimum values x_max and x min of the x-coordinate and the maximum and minimum values y max and y_min of the y-coordinate as illustrated in FIG. 3, and generate a cluster box by connecting each corner.

For example, when the cluster box is generated, the cluster box may be generated in a basic form in which the moving direction of the object is not included. Further, the cluster box may be an AABB (axis aligned bounding box) aligned with an axis of the coordinate system.

In operation 303, the object detection system 100 may perform a condition inspection (also referred to as a scene-based condition inspection) for determining a situation.

For example in FIG. 5, the condition check for determining a situation may be a check for determining whether a reference condition is satisfied, which may determine a situation where the target vehicle 5 discharges exhaust gas as in FIG. 5A.

The reference condition may include the following first condition, second condition, and/or third condition.

The first condition is that one cluster box (also referred to as a first cluster box) 51 generated as shown in FIG. 5B according to the above-described clustering is located within a region of interest (ROI).

In the case of an exhaust gas of a vehicle traveling apart from the vehicle 1 by a predetermined distance or more, points corresponding to the exhaust gas may not be acquired through the LiDAR sensor of the vehicle 1.

A region where points corresponding to exhaust gas among points obtained from the LiDAR sensor 12 are located may be specified as a specific longitudinal region, and the specific longitudinal region may be different according to sensor specifications of the LiDAR sensor 12.

As illustrated in FIG. 5B, the predetermined region of interest in an exemplary embodiment of the disclosure may include a predetermined region up to a predetermined distance 52 in front of the vehicle 1 on the coordinate system.

The second condition is that the size of the first cluster box 51 is included in the predetermined reference size range 53. Likewise, the second condition is a condition considering that the size of the first cluster box 51 is in a normal size range of the vehicle since the exhaust gas is generally discharged from the vehicle.

The third condition is that another object located between the target vehicle 5 and the vehicle 1 is not identified.

The third condition is included because LiDAR points corresponding to the exhaust gas may not be obtained when an object, e.g. another vehicle exists between the vehicle 1 and the target vehicle 5 emitting the exhaust gas.

For example, whether there is an object between the vehicle 1 and the target vehicle 5 emitting exhaust gas may be determined based on a determination of whether there is a preceding cluster box generated in the above-described clustering process. The preceding cluster box includes a cluster box greater than or equal to a predetermined threshold size within a threshold region between the original point in the coordinate system and the first cluster box. For example, the threshold region may correspond to a laser emitting region of the LiDAR sensor 12.

For example, when there is no preceding cluster box generated in the above-described clustering process, it may be determined that there is no object between the vehicle 1 and the target vehicle 5 discharging the exhaust gas, and when there is a preceding cluster box generated in the above-described clustering process, it may be determined that there is a preceding cluster box generated in the above-described clustering process.

For example, when the first condition and/or the second condition are satisfied, the object detection system 100 may determine whether a preceding cluster box is present to determine whether the third condition is satisfied.

The object detection system 100 may determine the position of the threshold line corresponding to the rear of the target vehicle based on the X-Y histogram when the reference condition is satisfied (305).

The object detection system 100 may analyze an X-Y histogram of object points of the cluster box and search for a dense line at a point having the greatest density to determine the threshold line which is estimated as corresponding to a rear surface of the target vehicle. The threshold line determined in this way may be used for separating the target vehicle and a non-vehicle area.

For example in reference to FIG. 6, the object detection system 100 may generate a grid map (also referred to as a first grid map) of an X-Y coordinate plane by matching and arranging the object points of a cluster box by projecting them onto the grid map as illustrated in FIG. 6A.

For example, as shown in FIG. 6B, the object detection system 100 may assign a numerical value indicating the number of object points matched to (or included in) a corresponding grid cell of the grid map.

For example, the numerical value of 0 may indicate that there are no object points matched to (or included in) the corresponding grid cell, the numerical value of 1 may indicate that there is one object point included in the corresponding grid cell, and the numerical value of 2 may indicate that there are two object points included in the corresponding grid cell.

The object detection system 100 may determine a row having the greatest density by searching rows of the grid map.

For example, where S indicates a sum of the numerical values of all the grid cells in a row, and R indicates a proportional ratio of grid cells (also referred to as non-empty grid cell) to which object points are matched to the total grid cells of the corresponding row, the object detection system 100 may determine a row having the largest S in the grid map of the X-Y coordinate plane, and may determine whether R of the row having the largest S is greater than or equal to a predetermined threshold ratio. As shown in FIGS. 6A and 6B, the object detection system 100 may determine the row having the largest S and the R greater than or equal to the predetermined threshold ratio as the position of the threshold line corresponding to the rear of the target vehicle.

For example in reference to FIGS. 6C and 6D, the threshold line may be the location where the target vehicle and the non-vehicle area (i.e., an exhaust gas region) are separated from each other. In FIG. 6C, the numeral number 61 indicates object points corresponding to the target vehicle, excluding object points corresponding to the exhaust gas distinguished according to the threshold line.

The object detection system 100 may determine the situation of the target vehicle based on the X-Z histogram (307).

The object detection system 100 may analyze an X-Z histogram of a non-vehicle area in which the target vehicle is not located to determine whether the X-Z histogram corresponds to a situation where the target vehicle emits exhaust gas, a situation where an event of fire occurred on the target vehicle, and/or a situation where a person and/or another object is present around the target vehicle.

For example, the situation where the target vehicle emits the exhaust gas may be determined in consideration of a feature in which the exhaust gas occurs at a muffler position of the corresponding vehicle and the density of points corresponding to the exhaust gas is low and the distribution is irregular.

The object detection system 100 may generate an X-Z grid map (also referred to as a second grid map) by matching and arranging object points of a cluster box on the grid map of the X-Z coordinate plane by projecting the points thereon. In this case, the object detection system 100 may determine the position of the threshold line on the X-Z grid map by associating information on the X coordinate of the row corresponding to the position of the threshold line determined on the X-Y corresponding grid map from the above-described operation.

The object detection system 100 as shown in FIG. 7 may determine the situation of the target vehicle by determining which distribution condition among the predetermined distribution conditions matches the distribution of the object points.

Referring to FIG. 7, the predetermined distribution conditions may include a predetermined first distribution condition, a predetermined second distribution condition, and/or a predetermined third distribution condition.

The first distribution condition may be a condition that is predetermined to correspond to an exhaust gas emission situation of the target vehicle.

The second distribution condition may be a condition predetermined to correspond to the situation where there is fire on the target vehicle and/or around the target vehicle.

The third distribution condition may be a condition predetermined to correspond to a situation where a person and/or another object are around the target vehicle.

Each of the first distribution condition, the second distribution condition, and the third distribution condition may include a condition that a cluster (also referred to as a first cluster) greater than or equal to a predetermined size is generated in a first region of two regions divided by the threshold line (also referred to as an X-coordinate threshold line) with grid cells to which at least one object point is matched adjacent to the threshold line.

The first distribution condition may include a condition that grid cells to which at least one object point is matched form an irregular shape (which may be referred to as "the object points have an irregular distribution") in the first region in a second region which is the other region of the two regions and the height (i.e. the maximum Z-axis coordinate value) of the corresponding cluster is smaller than that of the first cluster generated. That is, the first distribution condition may include a condition that the Z-axis value of the X-Z histogram is small and has a sparse distribution.

Also, the second distribution condition may include a condition that grid cells to which at least one object point is matched form an irregular shape in the second region, and the height (i.e. the maximum Z-axis coordinate value) of the corresponding cluster is greater than that of the first cluster generated. That is, the second distribution condition may include a condition that the Z value of the X-Z histogram is high and the distribution is irregular.

Also, the third distribution condition may include a condition that grid cells to which at least one object point is matched form a regular shape (which may be referred to as "the object points have a uniform distribution") in the second region of the grid map of the X-Z coordinate plane, and the height of the corresponding cluster is small as shown in FIG. 7 or high unlike FIG. 7. That is, the third distribution condition may include a condition that the X-Z histogram has a uniform distribution.

To determine whether the grid cells form a regular shape or an irregular shape, the object detection system 100 may compare the shape with at least one predetermined shape. For example, the at least one predetermined shape includes a person shape corresponding to a pedestrian or a vehicle shape corresponding to a vehicle, and thus if the grid cells forms a shape which matches with the person shape, then the system 100 may determine that the grid cells has a uniform distribution. On contrarily, if there is no one of the at least one predetermined shape which the shape of the grid cells matches with, then the system 100 may determine that the grid cells form an irregular shape.

The object detection system 100 may generate a bounding box depending on the situation of the target vehicle (309).

When it is determined that the situation of the target vehicle is exhaust gas emission according to operation 307, the object detection system 100 may separate the object points into the object points of the first region and the ones of the second region. The object detection system 100 may generate a cluster of the object points in the first region through the clustering process and generate a bounding box (also referred to as a first bounding box). In addition, the object detection system 100 may generate a cluster of the object points in the second region through the clustering process and generate a bounding box (also referred to as a second bounding box).

In addition, the object detection system 100 may generate one bounding box (also referred to as a third bounding box) based on all object points without separating the object points of the first region and the second region. For example, the third bounding box may have a shape of the combination of the first bounding box and the second bounding box.

In addition, according to operation 307 described above, when it is determined that the situation of the target vehicle is a fire occurrence in the target vehicle and/or around the target vehicle, the object detection system 100 may perform the clustering process for the all object points the first and second regions without separating them and generate a bounding box accordingly.

In addition, according to operation 307 described above, when it is determined that the situation of the target vehicle is a situation where a person and/or another object is present around the target vehicle, the object detection system 100 may perform the clustering process for the all object points the first and second regions without separating them and generate a bounding box accordingly.

The object detection system 100 may output information indicating the situation of the target vehicle and/or the generated bounding box (311).

For example, when it is determined that the situation of the target vehicle is the exhaust gas emission according to operation 307 described above, the object detection system 100 as shown in FIG. 8 may output a first bounding box 81 indicating an target vehicle, a second bounding box 83 indicating exhaust gas of the target vehicle, and a third bounding box 85 indicating both the target vehicle and the exhaust gas. In addition, when the first to third bounding boxes are output, the object detection system 100 may also output information indicating that the situation of the target vehicle is exhaust gas emission.

According to the above-described operation 307, when it is determined that the situation of the target vehicle is the fire occurrence, the object detection system 100 may output one bounding box indicating both the target vehicle and the fire, i.e., an unseparated bounding box. In addition, when the bounding box is output, the object detection system 100 may also output information indicating that the situation of the target vehicle is a fire occurrence in the target vehicle and/or around the target vehicle.

According to operation 307 described above, when it is determined that the situation of the target vehicle is a situation where a person and/or another object are present around the target vehicle, the object detection system 100 may output one bounding box indicating both the target vehicle and the person and/or another object, i.e., one unseparated bounding box. In addition, when the bounding box is output, the object detection system 100 may also output information indicating that the situation of the target vehicle is a situation where a person and/or another object are present around the target vehicle.

FIG. 9 is a flowchart of an operation of the object detection system 100 (and/or the processor 130 of the object detection system 100) according to an exemplary embodiment of the present disclosure.

Referring to FIG. 9, the object detection system 100 perform a clustering process the points obtained through the LiDAR sensor 12 of the vehicle 1 (901).

In operation 903, the object detection system 100 may perform a condition check (also referred to as a scene-based condition check) for determining a situation.

The object detection system 100 may determine the position of the threshold line corresponding to the rear of the target vehicle based on the X-Y histogram when it is determined that the reference condition is satisfied according to the condition check for determining the situation (905).

The object detection system 100 may determine the situation of the target vehicle based on the X-Z histogram (907).

The situation of the target vehicle may include the exhaust gas emission situation, the fire occurrence situation around the target vehicle and/or the target vehicle, and/or the situation where there are people and/or other objects in the vicinity of the target vehicle.

The object detection system 100 may determine whether the situation of the target vehicle is exhaust gas emission (909).

The object detection system 100 may perform operation 911 when the situation of the target vehicle is the exhaust gas emission, and may perform operation 913 when the situation of the target vehicle is not exhaust gas emission.

The object detection system 100 may generate a bounding box of each of the target vehicle and the exhaust gas (911).

For example, the object detection system 100 may generate a first bounding box for the target vehicle and a second bounding box for the exhaust gas.

In operation 913, the object detection system 100 may generate one bounding box for the all object points of cluster boxes generated through the clustering.

After operation 911 or operation 913, the object detection system 100 may output information indicating the situation of the target vehicle and the generated bounding box (915).

FIGS. 10 and 11 are diagrams illustrating a bounding box generated and output in a conventional object detection system and an object detection system according to an exemplary embodiment of the present disclosure.

Referring to FIG. 10, in a case where a target vehicle driving in front of the host vehicle emits exhaust gas as illustrated in FIG. 10A, the conventional object detection system outputs a bounding box as illustrated in FIG. 10B.

Referring to FIG. 10B, the conventional object detection system outputs a bounding box 1001 correspondingly after clustering all the points corresponding to a target vehicle and an exhaust gas as indicating one object.

The object detection system according to an exemplary embodiment of the present disclosure as shown in FIG. 10C may solve the conventional system error by distinguishing a bounding box 1003 for the points corresponding to the target vehicle from a bounding box 1005 for the points corresponding to the exhaust gas.

Referring to FIG. 11, when a person is located close to a vehicle as shown in FIG. 11A, the conventional object detection system outputs a bounding box as shown in FIG. 11B.

Referring to FIG. 11B, the conventional object detection system outputs one bounding box 1101 for the points corresponding to the target vehicle and one bounding box 1102 for the points corresponding to a person.

The object detection system 100 as shown in FIG. 11C according to an exemplary embodiment of the present disclosure, however, may output a bounding box 1103 in which all the points corresponding to the target vehicle and the person are grouped to represent one object, thereby allowing the vehicle 1 to avoid both the target vehicle and the person when driving.

The above-described embodiments may be implemented in the form of a recording medium for storing instructions executable by a computer. The instructions may be stored in the form of a program code, and when executed by a processor, may generate a program module to perform operations of the disclosed embodiments. The recording medium may be implemented as a computer-readable recording medium.

The computer-readable recording medium includes all types of recording media in which computer-readable instructions are stored. For example, there may be a Read Only Memory (ROM), a Random Access Memory (RAM), a magnetic tape, a magnetic disk, a flash memory, an optical data storage device, etc.

The embodiments disclosed above have been described with reference to the accompanying drawings. The embodiments of the present disclosure have been described above with reference to the accompanying drawings. A person having common skill in the art to which the present disclosure pertains relates to a form different from the disclosed embodiments without changing the technical concept or essential feature of the present disclosure. It will be understood that the present disclosure may be practiced. The disclosed embodiments are illustrative and should not be construed as limiting.

What is claimed is:

1. A method of detecting an object around a vehicle, the method including:

clustering points obtained from a Light Detection and Ranging (LiDAR) sensor of the vehicle;

determining a position of a threshold line corresponding to a rear of a first object based on object points of a cluster box generated according to the clustering; and dividing the cluster box into a first sub-cluster and a second sub-cluster based on the threshold line, and generating a first bounding box of the first object and a second bounding box of a second object based on a distribution of the object points of the first sub-cluster and the second sub-cluster.

2. The method of claim 1, further including determining whether a reference condition including at least one of a first condition that the cluster box is positioned within a predetermined region of interest, a second condition that a size of the cluster box is included in a predetermined reference size range, or a third condition that a third object is not detected between the first object and the vehicle is satisfied, wherein the determining of the position of the threshold line is performed when the reference condition is satisfied.

3. The method of claim 2, further comprising determining that the third object is not detected when no preceding cluster box is generated between the first object and the vehicle by the clustering, wherein the preceding cluster box includes a cluster box having a size greater than or equal to a predetermined threshold size.

4. The method of claim 2, further including generating a third bounding box of the first object based on the object points when the reference condition is not satisfied.

5. The method of claim 1, wherein the determining of the position of the threshold line corresponding to the rear surface of the first object comprises generating a first grid map of an XY coordinate plane on which the object points are projected and determining a row whose density of the object points is greatest among rows of the first grid map as a row in which a first threshold line is located.

6. The method of claim 5, wherein the first grid map includes first grid cells, and each grid cell of the first grid map is assigned with a numerical value indicating the number of object points included in the corresponding grid cell of the first grid map among the object points.

7. The method of claim 6, wherein the determining of the row whose density of the object points is greatest among the rows of the first grid map as the row in which the first threshold line is located comprises determining a sum of numerical values assigned to all grid cells of each of the rows of the first grid map, determining a ratio of the number of grid cells whose numerical values are greater than or equal to a predetermined threshold value to a total number of all grid cells for each row of the first grid map, and determining a row whose sum of the numerical values assigned to all grid cells thereof is greatest among the rows of the first grid map and the ratio of which is greater than or equal to a predetermined threshold ratio as the row whose density of the object points is greatest.

8. The method of claim 5, wherein the determining of the position of the threshold line corresponding to the rear surface of the first object comprises generating a second grid map of an XZ coordinate plane on which the object points are projected, determining a position of a second threshold line in the second grid map by associating information of an X coordinate of the row in which the first threshold line is located in the first grid map, and determining a distribution of the object points based on the position of the second threshold line in the second grid map, and wherein the determining of the distribution of the object points comprises determining a distribution of grid cells in which at least one object point among the object points is included based on the position of the second threshold line in the second grid map.

9. The method of claim 8, wherein the second grid map includes second grid cells, and each grid cell of the second grid map is assigned with a numerical value indicating the number of object points included in the corresponding grid cell of the second grid map among the object points.

10. The method of claim 8, wherein the first bounding box is generated based on first object points in a first region of two regions divided by the second threshold line on the second grid map, and wherein the second bounding box is generated based on second object points in a second region of the two regions.

11. The method of claim 10, further including outputting a third bounding box generated based on the object points when the first bounding box and the second bounding box are output, wherein the third bounding box has a shape of a combination of the first bounding box and the second bounding box.

12. The method of claim 10, wherein the generating of the first bounding box of the first object and the second bounding box of the second object is performed in a case where the first object points are uniformly distributed in the first region, first grid cells of the first map forms a first cluster whose size is greater than or equal to a predetermined threshold size, second grid cells of the second map in each of which at least one second object point is included are irregularly distributed in the second region, and a maximum Z-axis value of a second cluster of the second grid cells is smaller than a maximum Z-axis value of the first cluster.

13. The method of claim 12, further comprising:

determining that there is an event of fire corresponding to the second object around the first object in a case where the first object points are uniformly distributed in the first region, the first grid cells forms the first cluster whose size is greater than or equal to the predetermined threshold size, the second grid cells in each of which at least one second object point is included are irregularly distributed in the second region, and the maximum Z-axis value of the second cluster of the second grid cells is greater than the maximum Z-axis value of the first cluster; and outputting information indicating the event of fire.

14. The method of claim 13, further comprising:

determining that there is a person or another object corresponding to the second object around the first object in a case where the first object points are uniformly distributed in the first region, the first grid cells forms the first cluster whose size is greater than or equal to the predetermined threshold size, the second grid cells are uniformly distributed, the second cluster of the second grid cells has a size greater than or equal to a predetermined threshold size; and outputting information indicating that there is the person or the other object.

15. A system of detecting an object around a vehicle, the system comprising:

an interface for receiving points from a Light Detection and Ranging (LiDAR) sensor of the vehicle; and a processor electrically or communicatively connected to the interface, wherein the processor is configured to:

cluster points obtained from the LiDAR sensor of the vehicle;

determine a position of a threshold line corresponding to a rear of a first object based on object points of a cluster box generated according to the clustered points; and divide the cluster box into a first sub-cluster and a second sub-cluster based on the threshold line, and generate a first bounding box of the first object and a second bounding box of a second object based on a distribution of the object points of the first sub-cluster and the second sub-cluster.

16. The method of claim 15, wherein the processor is further configured to determine whether a reference condition including at least one of a first condition that the cluster box is positioned within a predetermined region of interest, a second condition that a size of the cluster box is included in a predetermined reference size range, or a third condition that a third object is not detected between the first object and the vehicle is satisfied to determine the position of the threshold line.

17. The method of claim 15, wherein the processor is further configured to generate a first grid map of an XY coordinate plane on which the object points are projected and determine a row whose density of the object points is greatest among rows of the first grid map as a row in which a first threshold line is located.

18. The method of claim 17, wherein the first grid map includes first grid cells, and each grid cell of the first grid map is assigned with a numerical value indicating the number of object points included in the corresponding grid cell of the first grid map among the object points.

19. The object detection system of claim 18, wherein the processor is further configured to determine a sum of numerical values assigned to all grid cells of each of the rows of the first grid map, determine a ratio of the number of grid cells whose numerical values are greater than or equal to a predetermined threshold value to a total number of all grid cells for each row of the first grid map, and determine a row whose sum of the numerical values assigned to all grid cells thereof is greatest among the rows of the first grid map and the ratio of which is greater than or equal to a predetermined threshold ratio as the row whose density of the object points is greatest.

20. The object detection system of claim 17, wherein the processor is further configured to:

generate a second grid map of an XZ coordinate plane on which the object points are projected and determine a position of a second threshold line in the second grid map by associating information of an X coordinate of the row in which the first threshold line is located in the first grid map; and determine a distribution of grid cells in which at least one object point among the object points is matched based on the position of the second threshold line in the second grid map.

* * * * *